United States Patent Office 3,442,829
Patented May 6, 1969

3,442,829
METHOD OF FOAMING THERMOPLASTIC POLYMERIC MATERIALS USING HYDROCARBYLTETRAZOLES AS THE FOAMING AGENT
Lane D. Moore, Vienna, W. Va., and John J. Randall, Cumberland, R.I., assignors to Borg-Warner Corporation, a corporation of Illinois
No Drawing. Filed Nov. 10, 1966, Ser. No. 593,308
Int. Cl. C08g 53/10; C0f 47/10
U.S. Cl. 260—2.5                4 Claims

ABSTRACT OF THE DISCLOSURE

Method of foaming thermoplastic polymeric materials using hydrocarbyltetrazoles as the foaming agent.

---

The present invention relates to cellular or expanded polymeric materials. More particularly, this invention relates to the use of hydrocarbyltetrazoles in the foaming of rubber and thermoplastic materials.

Prior to this invention, a great variety of blowing agents were utilized in preparing cellular or expanded thermoplastic materials. Many of the blowing agents utilized in preparing cellular rubber or thermoplastic materials were unsatisfactory for use with materials such as polypropylene, polysulfonate, polysulfone, polyethylene oxide, polycarbonate and ABS graft polymers due to the high temperatures required in processing these materials. Due to the fact that the processing temperatures on these materials were quite high, i.e., in the area of 450+° F., the blowing agents used prior to this invention had a tendency to become unstable prior to reaching the processing temperature and did not allow even distribution of the blowing agent nor uniformity of cell formation within the thermoplastics or thermoplastic blend.

It is well known that the decomposition of a blowing agent should not occur until the processing temperature has been reached. Complete evolution of gas should occur, however, prior to completion of the processing in order to produce a blown product of consistent density. Also, the blowing agent should not interfere with additives that are utilized in the processing of thermoplastics and rubbers.

Generally stated, the present invention is directed to the production of improved foam thermoplastics and thermoplastic blends by means of incorporation of a 5-hydrocarbyltetrazole therein. The 5-hydrocarbyltetrazole provides a sufficiently high decomposition temperature to allow processing to occur at temperatures of 450+° F. with uniform evolution of nitrogen gas and production of substantially uniform density foamed products.

The term "hydrocarbyl" as used herein with reference to the tetrazoles, is meant to include aliphatic, aromatic-substituted aliphatic, cycloaliphatic, and aromatic substituents on the 5 position of the tetrazole. The aliphatic tetrazoles are normally those having aliphatic substituents of from one to ten carbon atoms either straight or branch chained. The aromatic-substituted aliphatics are those having aromatic groups attached to alkylene groups containing up to about four carbon atoms. The cycloaliphatics are normally those containing three to ten carbon groups, and the aromatics are phenyl or substituted phenyl where the substituents may be selected from the group consisting of hydrogen, alkyl, haloalkyl, amino, alkylamino, aminoalkyl, halo, 5-tetrazolyl, nitro, nitroso and the like.

The 5-hydrocarbyltetrazoles utilized in this invention may be represented by the formula:

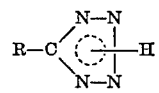

wherein R is selected from the group consisting of alkyl, cycloalkyl, arylalkyl groups, and phenyl and substituted phenyl groups of the formula:

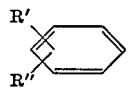

wherein R' and R" may be selected from the group consisting of hydrogen, alkyl, haloalkyl, amino, alkylamino, aminoalkyl, halo, 5-tetrazolyl, nitro, and nitroso.

The hydrocarbyltetrazoles utilized in this invention may be prepared by reacting an aromatic nitrile such as benzonitrile or substituted benzonitrile or aliphatic or cycloaliphatic nitrile in the presence of a metal azide and a Friedel-Crafts catalyst. The reaction may be carried out in the absence of a solvent with an extraordinarily short reaction time, i.e., from about fifteen minutes to twenty-four hours.

The blowing agents of this invention may be used with a great variety of rubbers and thermoplastic materials. For example, they may be used with polyethylene, polypropylene, polybutadiene, polyisoprene, polyvinyl halides, polyacrylates, polyamides, polycarbonates, polyphenylene oxides, polysulfones, polysulfonates and the like, as well as copolymers and graft polymers. The blowing agents of this invention are especially useful, as indicated, with polymers and copolymers that have high processing temperatures.

The preferred graft polymers that have been used in conjunction with the blowing agents of this invention are those prepared by first polymerizing at least one monomer to provide a backbone and thereafter polymerizing at least one other, and preferably two other monomers in the presence of the prepolymerized monomer to provide a graft polymer. The backbone may be provided by polymerizing a conjugated diene such as butadiene or a conjugated diene in the presence of a monovinyl aromatic hydrocarbon such as styrene to provide a polymerized diene rubbery backbone such as polybutadiene or a butadiene-styrene copolymer backbone.

After polymerization of the backbone, a second monomer or group of monomers is grafted to the rubbery backbone to complete the graft polymer. This is normally accomplished by addition and interaction under polymerization conditions of an acrylic acid nitrile and a monovinyl aromatic hydrocarbon exemplified respectively by acrylonitrile and styrene.

The backbone, i.e., conjugated diene polymer or copolymer is prepared so as to comprise from about 60 percent to about 10 percent by weight of the total composition and the acrylic acid nitrile and monovinyl aromatic hydrocarbon that is polymerized in the presence of the backbone polymer or copolymer comprises from about 40 percent to about 90 percent of the total composition.

The acrylic acid nitrile preferably comprises from about 5 percent to about 30 percent by weight of the three-component organic mixture and the monovinyl aromatic hydrocarbon comprises from about 30 percent to about 80 percent of the total composition. The term "monovinyl aromatic hydrocarbon" is meant to include compounds such as styrene, α-methylstyrene, vinyl toluene, vinyl xylene, ethylvinylbenzene, isopropyl styrene, chlorostyrene, dichlorostyrene, ethylchlorostyrene, mixtures thereof and the like. The term "acrylic acid nitrile" is meant to include compounds such as acrylonitrile, methacrylonitrile, ethacrylonitrile, chloroacrylonitrile, mixtures thereof and the like.

In preparing foam products in accordance with this invention, a thermoplastic material is brought to processing temperature and mixed with a 5-hydrocarbyltetrazole in a suitable mixing apparatus such as a Banbury mixer. Ordinarily, in the order of 0.2 percent to about 15 percent blowing agent is employed by adding it to the thermoplastic material in the Banbury mixer. It is understood that decreasing densities are obtained as the amount of blowing agent is increased and generally the density of the finished product will range from about .3 to about .9 gram per cubic centimeter. It has been found that the amount of blowing agent is preferably between about 0.2 and 5 percent when blowing resinous material, and higher amounts, i.e., generally from 0.5 to 15 percent by weight when blowing rubbery materials.

In the examples, specific amounts of blowing agent with various thermoplastic materials is set forth for the purpose of illustration. It will be understood by those skilled in the art that the particular resin and particular blowing agent selected from the class of 5-hydrocarbyltetrazoles will have an effect on the degree of cell formation and density of the resulting product.

Example 1

1000 g. of low flow polypropylene having a melt flow of 0.6 to 0.8 was mixed with 10 g. of 5-phenyltetrazole in a Banbury mixer. The mixed mass was milled into a sheet, cut into strips and ground into chips. These chips were used to make expanded discs of different densities by placing weighed amounts of chips into a multiple cavity mold (ca. 67 cm.$^3$ per cavity) and placing in a press preheated to 550° F. for 15 minutes. The discs had a density range from .3 to .5 gram per cubic centimeter. In all cases, good surface and cell structure was obtained. No discoloration was noted.

Example 2

1200 g. of a 50/50 blend of ABS graft polymer/polycarbonate was mixed with 5-phenyltetrazole (12 g.) in a Banbury mixer at ca. 380° F. The graft ABS polymer contained about 51 parts by weight of styrene, 29 parts by weight acrylonitrile polymerized in the presence of about 20 parts by weight of ploybutadiene. The mixed mass was milled into a sheet cut into strips and ground. This material was molded into discs as in Example 1, in a press preheated to 535° F. for fifteen minutes. The discs had a density range of .3 to .5 gram per cubic centimeter with good cell structure and a smooth surface.

Example 3

10 g. of 5-phenyltetrazole was added to 1 kg. of a graft ABS polymer containing about 29 parts by weight acrylonitrile, about 51 parts by weight styrene polymerized in the presence of about 20 parts by weight polybutadiene in the form of resin pellets and the mixture was milled for one minute in a Banbury mixer at ca. 380° F. The mass was milled into a sheet on a hot roll mill and then cut into strips which were subsequently ground into pellets.

Blown parts were prepared by cast (compression) molding and injection molding. Cast molded parts were fabricated by heating in a closed mold in an electric press for 30 minutes at 525° F. Injection molded parts were molded on a screw type machine at a stock temperature of 540° F. Parts were obtained having good cell structure and having densities of from about 0.5 to about 0.8 gram per cubic centimeter depending on the amount of material metered into the mold. Blown parts may also be prepared by extrusion.

Example 4

1000 g. of polysulfonate homopolymer is mixed with 10 g. of p-phenylene-bis-(5-tetrazole) in a Banbury mixer. The mixed mass is milled into a sheet, cut into strips and ground into chips. These chips are used to make expanded discs of different densities by placing weighed amounts of chips into a multiple cavity mold (ca. 67 cm.$^3$ per cavity) and placing in a press preheated to about 580° F. for fifteen minutes. The resulting discs have a density range from about .3 to about .5 gram per cubic centimeter. In all cases, good cell structure is obtained. Little or no discoloration is noted.

Example 5

1000 g. of polycarbonate homopolymer is mixed with 10 g. of p-phenylene-bis-(5-tetrazole) in a Banbury mixer. The mixed mass is milled into a sheet, cut into strips and ground into chips. These chips are used to make expanded discs of different densities by placing weighed amounts of chips into a multiple cavity mold (ca. 67 cm.$^3$ per cavity) and placing in a press preheated to about 600° F. for fifteen minutes. The resulting discs have a density range from about .3 to about .5 gram per cubic centimeter. In all cases, good cell structure is obtained. Little or no discoloration is noted.

Example 6

1000 g. of polysulfone homopolymer is mixed with 10 g. of p-phenylene-bis-(5-tetrazole) in a Banbury mixer. The mixed mass is milled into a sheet, cut into strips and ground into chips. These chips are used to make expanded discs of different densities by placing weighed amounts of chips into a multiple cavity mold (ca. 67 cm.$^3$ per cavity) and placing in a press preheated to about 580° F. for fifteen minutes. The resulting discs have a density range from about .3 to about .5 gram per cubic centimeter. In all cases, good cell structure is obtained. Little or no discoloration is noted.

Example 7

1000 g. of polyphenylene oxide is mixed with 10 g. of p-phenylene-bis-(5-tetrazole) in a Banbury mixer. The mixed mass is milled into a sheet, cut into strips and ground into chips. These chips are used to make expanded discs of different densities by placing weighed amounts of chips into a multiple cavity mold (ca. 67 cm.$^3$ per cavity) and placing it in a press preheated to 580° F. for fifteen minutes. The resulting discs have a density range from about .3 to about .5 gram per cubic centimeter. In all cases, good cell structure is obtained. Little or no discoloration is noted.

Example 8

1000 g. of polypropylene melting in the range of 425–490° F. is mixed with 10 g. of 5-methyltetrazole in a Banbury mixer. The mixed mass is milled into a sheet, cut into strips and ground into chips. These chips are used to make expanded discs of different densities by placing weighed amounts of chips into a multiple cavity mold (ca. 67 cm.$^3$ per cavity) and placing in a press preheated to about 425° F. for fifteen minutes. The resulting discs have a density range from about .3 to about .5 gram per cubic centimeter. In all cases, good cell structure is obtained. Little or no discoloration is noted.

Example 9

1000 g. of polypropylene melting in the range of 425–490° F. is mixed with 10 g. of 5-(benzyl)-tetrazole in a Banbury mixer. The mixed mass is milled into a sheet, cut into strips and ground into chips. These chips are used to make expanded discs of different densities by placing weighed amounts of chips into a multiple cavity mold (ca. 67 cm.$^3$ per cavity) and placing in a press preheated to about 445° F. for fifteen minutes. The resulting discs have a density range from about .3 to about .5 gram per cubic centimeter. In all cases, good cell structure is obtained. Little or no discoloration is noted.

Example 10

1000 g. of polypropylene melting in the range of 425–490° F. is mixed with 10 g. of 5-(p-toluyl)-tetrazole in a Banbury mixer. The mixed mass is milled into a sheet, cut into strips and ground into chips. These chips are used to make expanded discs of different densities by placing weighed amounts of chips into a multiple cavity mold (ca. 67 cm.³ per cavity) and placing in a press preheated to about 480° F. for fifteen minutes. The resulting discs have a density range from about .3 to about .5 gram per cubic centimeter. In all cases, good cell structure is obtained. Little or no discoloration is noted.

The above examples set forth those conditions under which given thermoplastic materials were made into foamed products utilizing specific blowing agents falling within the scope of this invention. It will be understood that the blowing temperature may vary between 400° and 600° F. dependent, of course, upon the kind of thermoplastic that is being prepared as well as the given blowing agent that is utilized in preparing the foamed thermoplastic.

It will be understood that while the invention has been described in connection with certain specific embodiments thereof, that this is by way of illustration and not by way of limitation and that the scope of the invention is defined solely by the appended claims, which should be construed as broadly as is consistent with the prior art.

What is claimed is:

1. A process of producing an expanded thermoplastic composition selected from the group consisting of acrylic acid nitrile-conjugated diene-monovinyl aromatic hydrocarbon polymers, polyethylene, polypropylene, polybutadiene, polyisoprene, polyvinyl halides, polyacrylate, polyamides, polycarbonate, polyphenylene oxide, polysulfones, polysulfonates having substantially uniform cell structure throughout which comprises incorporating into said composition from 0.2 percent to about 15 percent of a 5-hydrocarbyltetrazole of the formula:

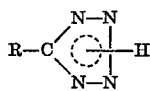

wherein R is selected from the group consisting of alkyl, arylalkyl and cycloalkyl groups, and phenyl and substituted phenyl of the formula:

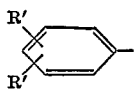

wherein R' and R" are selected from the group consisting of hydrogen, alkyl, haloalkyl, amino, alkylamino, aminoalkyl, halo, 5-tetrazolyl, nitro and nitroso, and heating said composition to a temperature between about 400° F. and 600° F. until foaming of said structure is complete.

2. A process of producing an expanded acrylic acid nitrile-conjugated diene-monovinyl aromatic hydrocarbon graft polymer containing from about 10 percent by weight to about 60 percent by weight of a rubbery backbone material selected from the group consisting of polybutadiene polymer and butadienestyrene copolymer and from about 40 percent to about 90 percent by weight of an acrylic acid nitrile and monovinyl aromatic hydrocarbon polymerized in the presence of said rubbery backbone material, said thermoplastic composition prepared with substantially uniform cell structure throughout by incorporating into said ABS graft polymer from about 0.2 percent to about 15 percent of a 5-phenyltetrazole compound and heating said composition to a temperature between about 400° F. and about 600° F. until foaming and expanding of said structure is complete.

3. The process of claim 1 wherein said thermoplastic composition is an acrylic acid nitrile-conjugated diene-monovinyl aromatic hydrocarbon graft polymer-polycarbonate blend.

4. An expandable thermoplastic material selected from the group consisting of acrylic acid nitrile-conjugated diene-monovinyl aromatic hydrocarbon polymers, polyethylene, polypropylene, polybutadiene, polyisoprene, polyvinyl halides, polyacrylate, polyamides, polycarbonate, polyphenylene oxide, polysulfones, and polysulfonates prepared by incorporating into said thermoplastic material from about .2 percent to about 15 percent by weight of a 5-hydrocarbyltetrazole of the formula:

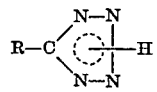

wherein R is selected from the group consisting of alkyl and arylalkyl and cycloalkyl groups and phenyl and substituted phenyl of the formula:

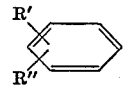

wherein R' and R" are selected from the group consisting of hydrogen, alkyl, haloalkyl, alkylamino, aminoalkyl, halo, 5-tetrazolyl, nitro, and nitroso.

References Cited
UNITED STATES PATENTS

| | | | |
|---|---|---|---|
| 3,338,915 | 8/1967 | Brown | 260—2.5 |
| 3,366,581 | 1/1968 | Reed | 260—2.5 |
| 3,374,188 | 3/1968 | Marsh et al. | 260—2.5 |

OTHER REFERENCES

Chemical Reviews, vol. 41, 1947, Benson, "Chemistry of the Tetrazoles," pages 30–32 and 57.

MURRAY TILLMAN, Primary Examiner.

MORTON FOELAK, Assistant Examiner.

U.S. Cl. X.R.

260—75, 309.4